United States Patent [19]
Bost

[11] Patent Number: 5,529,427
[45] Date of Patent: Jun. 25, 1996

[54] WHEELCHAIR COUPLER APPARATUS

[76] Inventor: Charles H. Bost, 1520 Eckert Dr., Winter Haven, Fla. 33881

[21] Appl. No.: 370,402

[22] Filed: Jan. 9, 1995

[51] Int. Cl.$^6$ .................................. A61G 3/08; F16B 1/02
[52] U.S. Cl. .................. 403/391; 280/304.1; 280/250.1; 297/248; 403/316
[58] Field of Search ............................. 280/250.1, 304.1; 297/248; 5/658; 403/391, 389, 316, 315; 108/64; 312/280

[56] References Cited

U.S. PATENT DOCUMENTS

| | | | |
|---|---|---|---|
| 123,549 | 2/1872 | Brooks | 297/248 X |
| 712,898 | 11/1902 | Barney | 297/248 |
| 4,805,938 | 2/1989 | Redmond et al. | 297/248 X |
| 5,118,127 | 6/1992 | Partington | 280/304.1 X |
| 5,236,213 | 8/1993 | Trickett | 280/304.1 |

FOREIGN PATENT DOCUMENTS

| | | | |
|---|---|---|---|
| 477917 | 10/1951 | Canada | 297/248 |
| 540027 | 12/1931 | Germany | 297/248 |
| 712810 | 7/1954 | United Kingdom | 297/248 |

*Primary Examiner*—Anthony Knight
*Attorney, Agent, or Firm*—William M. Hobby, III

[57] ABSTRACT

A wheelchair coupler apparatus for coupling two wheelchairs together allows the two wheelchairs to be pushed simultaneously by one person. The wheelchair coupler has an elongated arm having a pair of end portions with each end portion having a wheelchair frame engaging portion for attaching the elongated arm to a first wheelchair frame. A second wheelchair attaching member is attached to the elongated arm and extends generally perpendicular and has a wheelchair frame engaging fastener for removably attaching to a second wheelchair frame so that the elongated arm is attached to one wheelchair and a second wheelchair attaching member is attached to a second wheelchair to thus couple the wheelchairs together. The second wheelchair attaching member is hingedly attached to the elongated arm so that it can be folded out of the way when the wheelchairs are not coupled together. The elongated arm is attached to a first wheelchair frame by sliding a U-shaped end onto one frame member and an L-shaped opposite end onto another frame member and sliding a fastening bracket to seal the L-shaped end to another frame member. A second wheelchair attaching member is attached to a second wheelchair with a U-shaped end portion which slips over a wheelchair frame member and has a sliding fastener to lock the wheelchair frame member together.

11 Claims, 2 Drawing Sheets

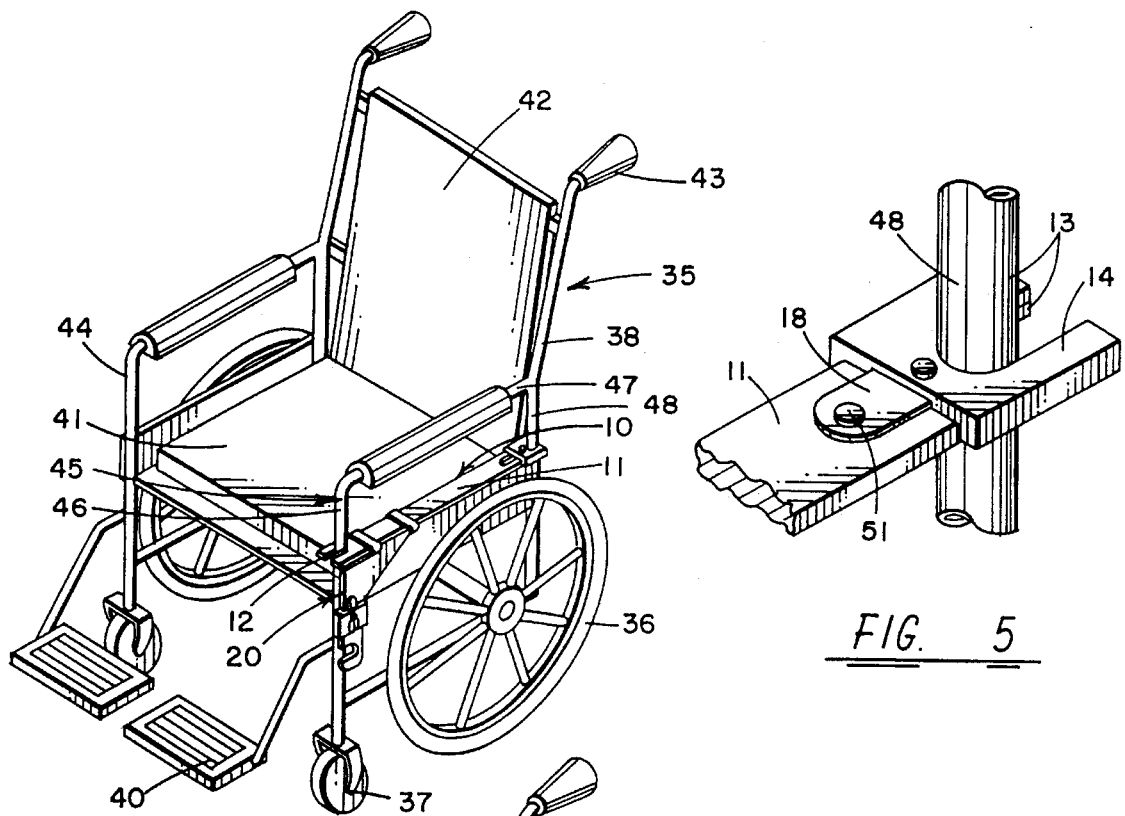
FIG. 3
FIG. 5
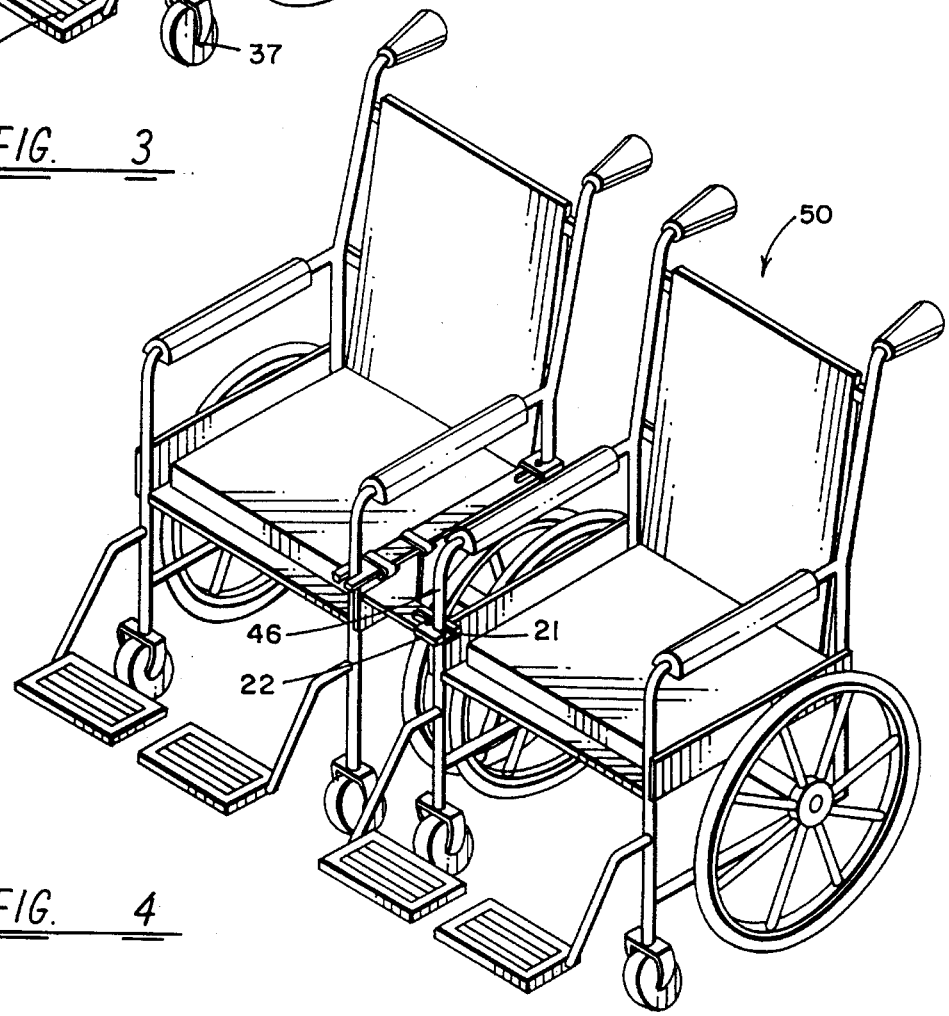
FIG. 4

WHEELCHAIR COUPLER APPARATUS

BACKGROUND OF THE INVENTION

The present invention relates to a wheelchair coupler for coupling two wheelchairs together to permit moving the two wheelchairs at one time.

Hospitals, nursing facilities, and even airports have a large number of wheelchairs for transporting disabled patient persons. Wheelchairs typically have seat and back portions for the patient to seat upon, along with a pair of large wheels mounted to the side of the chair and a pair of smaller wheels for maintaining the balance of the wheelchair. Wheelchairs typically have foot rests for a patient's feet and a pair of arms are formed with the frame, typically of metal pipe. Wheelchairs commonly have handgrips for a person to push the wheelchair and its occupant. Frequently a nurse or other person is required to move two patients in a pair of wheelchairs or is required to move empty wheelchairs between different locations. This currently is accomplished with difficulty in that the nurse or orderly has to manipulate the wheelchairs simultaneously. This requires a person to push one wheelchair while pulling a second one or holding each wheelchair by one arm or handgrip and guiding both chairs simultaneously.

The present invention relates to a rapid connection for a pair of wheelchairs which allows them to be quickly coupled together so that both wheelchairs are maneuvered simultaneously by one person, either with or without patients in the wheelchairs. The present wheelchair coupler quickly connects to one wheelchair and has a swinging coupling arm which is hinged so that it can be kept out of the way and then rotated to an operative position for engaging the frame of a second wheelchair.

SUMMARY OF THE INVENTION

A wheelchair coupler apparatus for coupling two wheelchairs together allows the two wheelchairs to be pushed simultaneously by one person. The wheelchair coupler has an elongated arm having a pair of end portions with each end portion having a wheelchair frame engaging portion for attaching the elongated arm to a first wheelchair frame. A second wheelchair attaching member is attached to the elongated arm and extends generally perpendicular thereto and has a wheelchair frame engaging fastener for removably attaching to a second wheelchair frame so that the elongated arm is attached to one wheelchair and a second wheelchair attaching member is attached to a second wheelchair to thereby couple the wheelchairs together. The second wheelchair attaching member is hingedly attached to the elongated arm so that it can be folded out of the way when the wheelchairs are not coupled together. The elongated arm is attached to a first wheelchair frame by sliding a U-shaped end onto one frame member and an L-shaped opposite end onto another frame member and sliding a fastening bracket to seal the L-shaped end to another frame member. A second wheelchair attaching member is attached to a second wheelchair with a U-shaped end portion which slips over a wheelchair frame member and has a sliding fastener to lock the wheelchair frame member thereto.

BRIEF DESCRIPTION OF THE DRAWINGS

Other objects, features, and advantages of the present invention will be apparent from the written description and the drawings in which:

FIG. 3 is a perspective view of a wheelchair having the wheelchair coupler of FIGS. 1 and 2 attached thereto;

FIG. 4 is a perspective view of a pair of wheelchairs coupled with the wheelchair coupler of FIGS. 1 and 2; and FIG. 5 is a perspective view of the locking position for a wheelchair coupler.

DESCRIPTION OF THE PREFERRED EMBODIMENT

Figure 1:
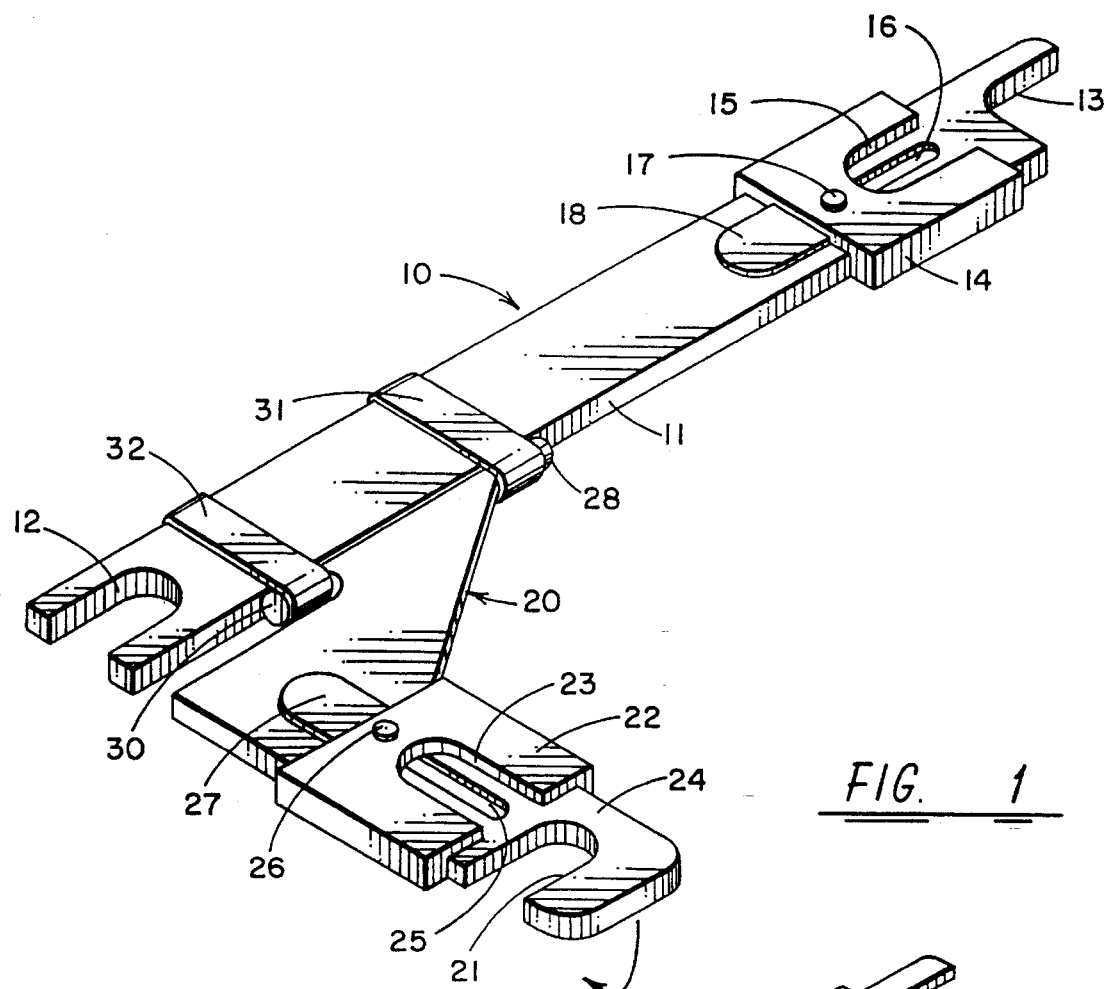
FIG. 1 is a perspective view of a wheelchair coupler in accordance with the present invention having the coupling arm in a raised position.
Figure 2:
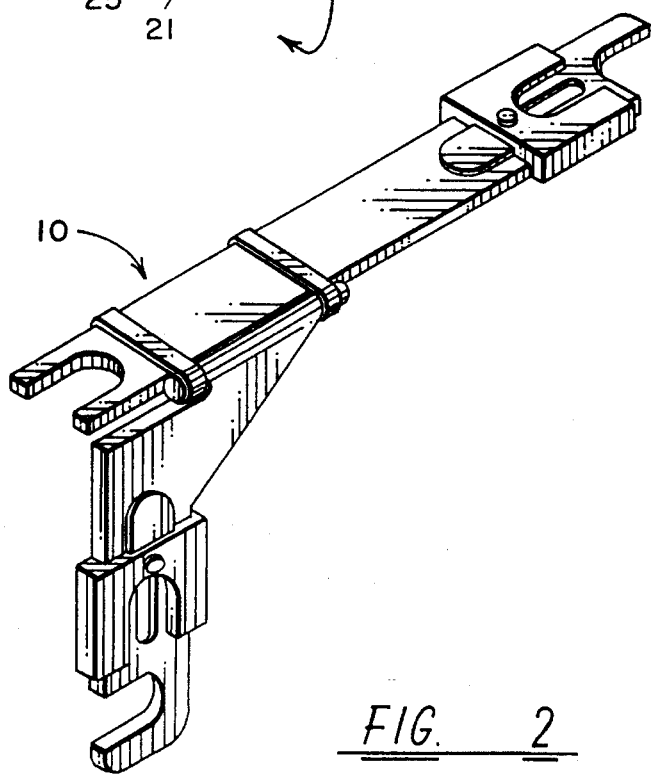
FIG. 2 is a perspective view of the wheelchair coupler of FIG. 1 with the coupling arm in a downward position.

Referring to the drawings and especially to FIGS. 1 and 2, the wheelchair coupler 10 has an elongated arm 11 having a U-shaped end portion 12 at one end of the arm 11 and an L-shaped end portion 13 at the other end of the arm 11. A sliding latching member 14 slides on the arm 11 and has a U-shaped locking portion 15 which is slidable over the L-shaped portion 13 to thereby create a U-shaped portion out of the L-shaped portion 13. An elongated slot 16 has a stud 17 extending thereinto and attaching to a spring 18 which holds the sliding member 14 in place in a retracted position, as shown in FIG. 1 or in the extended positions over the L-shaped end 13 as shown in FIG. 2. The slot 16 stops the sliding of the member 14 in either direction while the spring 18 holds it in place. A wheelchair coupling arm 20 has a U-shaped end portion 21 on the end thereof and a sliding latching member 22 having a U-shaped portion 23 and riding on the arm portion 24. The arm portion 24 has an elongated slot 25 therein while the sliding member 22 has a stud 26 sliding in the slot 25 and spring 27. The wheelchair coupling arm 20 has a pair of cylindrical hinge studs 28 and 30 on the other end thereof hinged in a pair of steel bands 31 and 32. Band 31 extends around the elongated member 11 and expands over the stud 28 while the band 32 extends around the elongated member 11 and around the hinge stud 30 so that the hinge studs 28 and 30 are held by the bands 31 and 32 in a position that the arm 20 can rotate on the hinge studs 28 and 30. The hinge pins can have bushings thereover to improve the life of the hinge.

The arm 11 and the arm 20 can be made of a polymer, if desired, but these arms can also be made of a metal, such as aluminum. In FIG. 2, the arm 20 is shown rotated on the hinge members 28 and 30 to a downward position.

Turning to FIG. 3, a wheelchair 35 has a pair of large wheels 36 and a pair of supporting small wheels 37. The wheelchair has a frame 38 and a pair of patient feet support 40 and a seat 41 and back 42 along with a pair of handgrips 43. The wheelchair has arms 44 and 45. The arm 45 has a front frame member 46, top arm portion 47, and a rear frame member 48. The wheelchair coupler 10 is shown coupled between the arm frame member 46 and the frame member 48 and the U-shaped end 12 has been slipped over the arm frame member 46 on the front of the wheelchair while the L-portion 13 has been placed against the frame member 48 and the latching member 14 slid forward to make a U-shaped member over the frame member 48 to hold the elongated arm between the wheelchair arm frame members 46 and 48.

The wheelchair coupling arm 20 is shown in a rotated down position out of the way in FIG. 3 but in FIG. 4 is in a raised position and has the U-shaped portion 21 on the end thereof locking onto an arm frame member 46 on a second wheelchair 50. The latching member 22 has been slid forward to latch the U-shaped member 21 onto the arm frame member 46 of the second wheelchair 50 so that the two wheelchairs are now latched together, as shown in FIG. 4, so that one person can maneuver both wheelchairs, either with or without patients therein. The coupling is sufficiently rigid that an operator has no difficulty in handling both wheelchairs with just one hand, if desired, and can easily maneuver the pair of wheelchairs with great dexterity.

Turning to FIG. 5, the elongated arm 11 can be seen having the latching member 14 slid forward over the L-shaped portion 13 and onto the wheelchair frame member 48 with the spring 18 sliding forward until a latching tab member 51 falls into the end of the elongated slot 16 which holds the latching member 14 in place. The latching member can be firmly grabbed and pulled backwards to force the tab 51 out of the slot for disengaging the latching member 14 and removing the wheelchair coupler 10 from the first wheelchair 35.

It should be clear at this point that a wheelchair coupler mechanism has been provided which is both simple to manufacture and easily and rapidly attached to a wheelchair. The wheelchair coupler is supported out of the way of the wheelchair and allows the easy coupling of a second wheelchair to the first wheelchair to thereby allow the maneuvering of the pair of wheelchairs simultaneously by one person. However, it should be clear that the present invention is not to be construed as limited to the forms shown which are to be considered illustrative rather than restrictive.

I claim:

1. A wheelchair coupler for coupling two wheelchairs together comprising:

an elongated arm having a pair of end portions and having means for attaching said elongated arm to a wheelchair, said means for attaching said elongated arm to a wheelchair having a wheelchair frame engaging portion on both end portions of said elongated arm for attaching said elongated arm to a first wheelchair arm; and a second wheelchair attaching member attached to said elongated arm and extending generally perpendicular thereto and having means for removably attaching said second wheelchair attaching member to a second wheelchair, whereby said elongated arm is attached to one wheelchair and said second wheelchair attaching member is attached to a second wheelchair to thereby couple said wheelchairs together.

2. A wheelchair coupler for coupling two wheelchairs together in accordance with claim 1 in which said elongated arm wheelchair frame engaging portion has a U-shaped end shaped to engage a tubular frame member of a wheelchair.

3. A wheelchair coupler for coupling two wheelchairs together in accordance with claim 2 in which said elongated arm wheel chair frame engaging portion has an L-shaped end for engaging a second frame member of a wheelchair to lock said elongated member between frame members of said wheelchair.

4. A wheelchair coupler for coupling two wheelchairs together in accordance with claim 3 in which said elongated arm wheel chair frame engaging portion L-shaped end has a movable latching member movable on said elongated arm to move said latching member into and out of engagement with said wheelchair frame member.

5. A wheelchair coupler for coupling two wheelchairs together in accordance with claim 4 in which said second wheelchair coupling member is hingedly attached to said elongated arm.

6. A wheelchair coupler for coupling two wheelchairs together in accordance with claim 5 in which a said second wheelchair coupling member means for removably attaching said second wheelchair coupling member has a latching member on one end portion thereof to lock said second wheelchair coupling member to a second wheelchair.

7. A wheelchair coupler for coupling two wheelchairs together in accordance with claim 6 in which said second wheelchair coupling member includes a U-shaped portion and a sliding latching member slidable over the open end of said U-shaped portion to lock said second wheelchair coupling to a second wheelchair.

8. A wheelchair coupler for coupling two wheelchairs together in accordance with claim 7 in which said second wheelchair coupling member has a pair of cylindrical studs on one end thereof rotatable in a pair of elongated arm openings.

9. A wheelchair coupler for coupling two wheelchairs together in accordance with claim 8 in which said elongated arm openings are formed by two bands around said elongated arm.

10. A wheelchair coupler for coupling two wheelchairs together in accordance with claim 9 in which said elongated arm an elongated slot therethrough for said sliding latch member to slide over and said sliding latch member has a guide member extending therein.

11. A wheelchair coupler for coupling two wheelchairs together in accordance with claim 10 in which said elongated arm sliding latch member has a spring latch thereon for holding said sliding latch member in a set position.

\* \* \* \* \*